June 24, 1947.　　　G. MOORADIAN　　　2,422,843
UNIVERSAL CUT-OFF SAW
Original Filed May 10, 1940　　　3 Sheets-Sheet 1
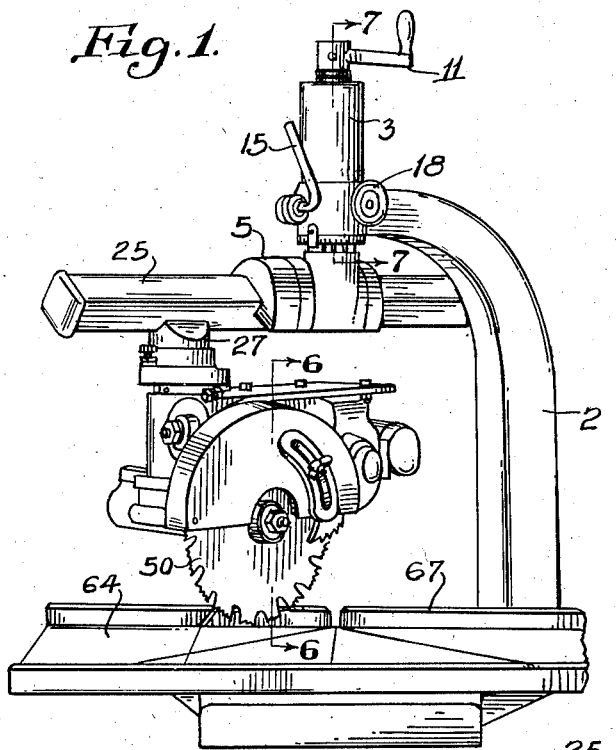
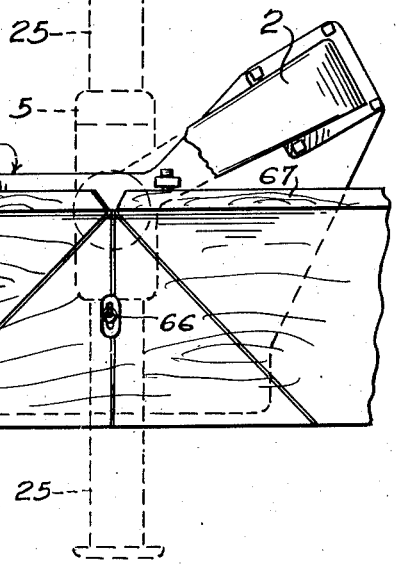
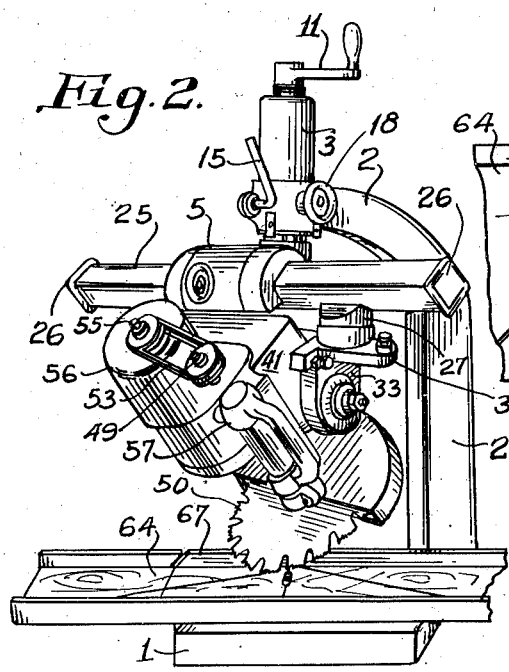
INVENTOR.
George Mooradian
BY C. Lauren Maltby
ATTORNEY.

June 24, 1947.  G. MOORADIAN  2,422,843
UNIVERSAL CUT-OFF SAW
Original Filed May 10, 1940   3 Sheets-Sheet 2
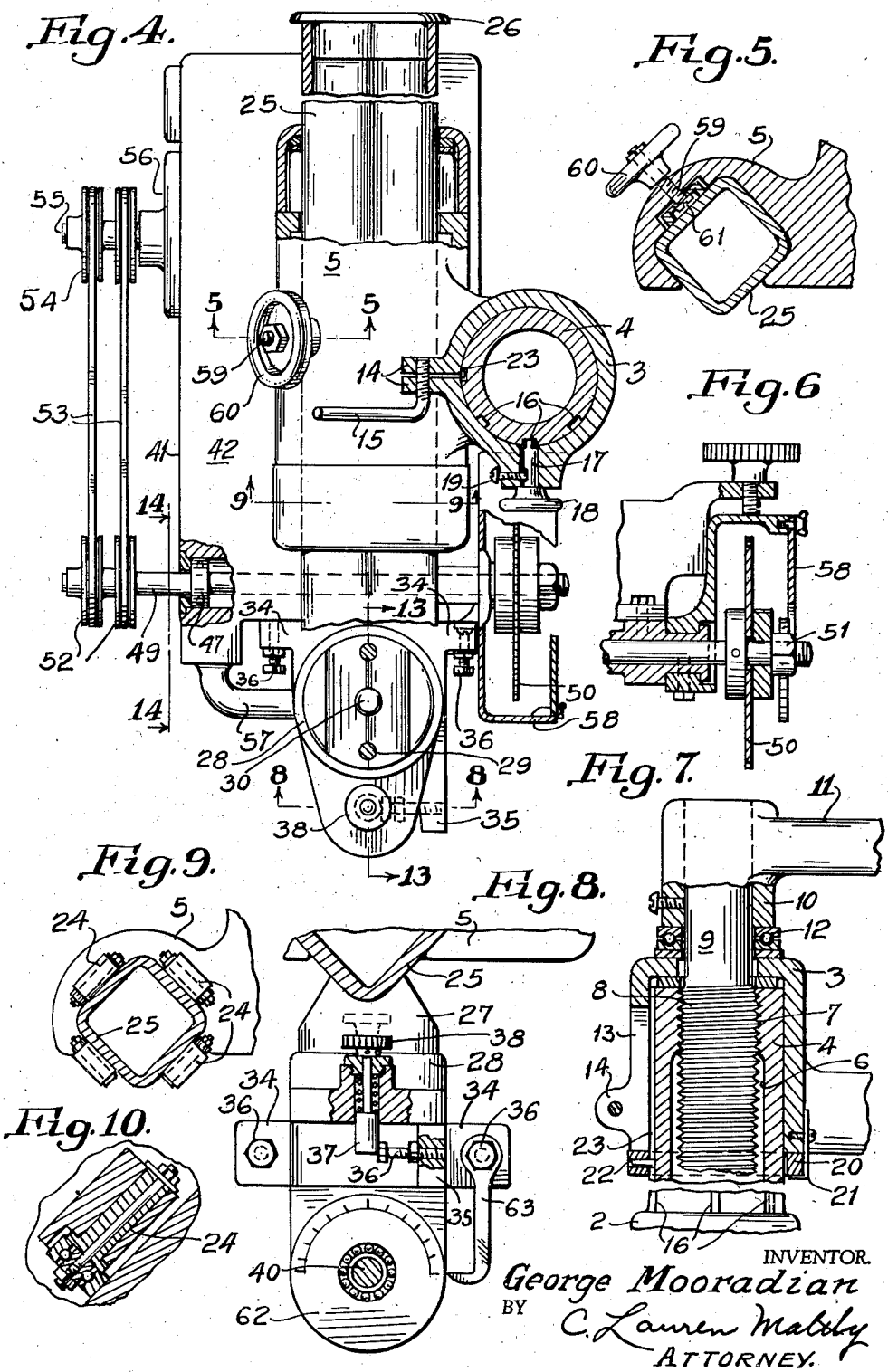
INVENTOR.
George Mooradian
BY C. Lauren Maltby
ATTORNEY.

June 24, 1947. G. MOORADIAN 2,422,843
UNIVERSAL CUT-OFF SAW
Original Filed May 10, 1940 3 Sheets-Sheet 3

INVENTOR.
George Mooradian
BY C. Lauren Maloby
ATTORNEY.

Patented June 24, 1947

2,422,843

UNITED STATES PATENT OFFICE 2,422,843

UNIVERSAL CUTOFF SAW

George Mooradian, Los Angeles, Calif.

Substituted for application Serial No. 334,374, May 10, 1940. This application September 16, 1944, Serial No. 554,447

1 Claim. (Cl. 143—6)

This invention relates to saw machinery and more especially to an improved type of a rotary saw adapted for angle cutting about both vertical and horizontal axes.

This application is a substitute for applicant's earlier application, Serial No. 334,374, filed May 10, 1940, and forfeited.

An object of the invention is to provide a simple, practical and efficient rotary saw of the character described.

Another object is to provide a cut-off saw that is pivotally adjustable about a vertical and horizontal axis.

A further object is to provide a rotary cut-off saw having an improved type of mounting for horizontal movement.

Another object is to provide a rotary cut-off saw mounted for adjustment in the vertical plane.

An additional object is to provide a rotary cut-off saw having angular adjustments about horizontal and vertical axes and having indexing and angle reading scale means.

Other objects and advantages will appear and be brought out more fully in the following specification, reference being had to the accompanying drawings herein.

Fig. 1 is a perspective view of an embodiment of my invention.

Fig. 2 is a view similar to Fig. 1 showing the saw in a different position.

Fig. 3 is a plan view of the saw table.

Fig. 4 is a plan view partly in section of the saw structure.

Fig. 5 is a sectional view taken along the line 5—5 of Fig. 4.

Fig. 6 is a sectional view taken along the line 6—6 of Fig. 1.

Fig. 7 is a sectional view taken along the line 7—7 of Fig. 1.

Fig. 8 is a sectional view taken along the line 8—8 of Fig. 4.

Fig. 9 is a sectional view taken along the line 9—9 of Fig. 4.

Fig. 10 is a sectional view of one of the eccentrically mounted roller bearings shown in Fig. 9.

Figure 13:
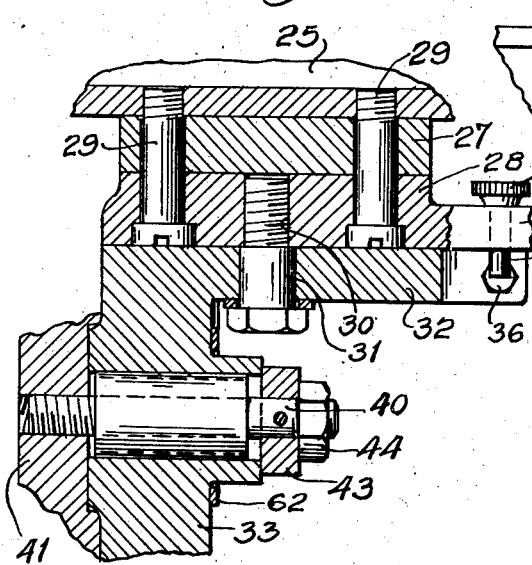
Fig. 13 is a sectional view taken along the line 13—13 of Fig. 4.

Referring more particularly to the drawings, I show a substantially flat base 1 having a pedestal 2 rising from a corner portion thereof, the pedestal having an overhanging upper end terminating in a cylindrical housing 3 adapted to receive a spindle portion 4 of a roller bearing casing 5. See Fig. 7. Spindle 4 has a bore 6, a threaded portion 7 of which is adapted to engage a threaded portion 8 of an elevating screw 9 suitably secured in the sleeve portion 10 of a crank handle 11. A ring bearing 12 mounted on housing 3 supports sleeve 10.

Housing 3 is slotted at 13 and is provided with a pair of lips 14 adjacent thereto which may be tightened by a screw lock lever 15 whereby to lock spindle 4 in housing 3 and prevent rotation of the spindle. Spindle 4 is provided with a plurality of vertical flutes or grooves 16 of which three are shown and spaced at forty-five degrees circumferentially.

An indexing pin 17 is suitably mounted so that one end may enter grooves 16 and is provided with knob 18 and a lock screw 19. A scale collar 20 is mounted on spindle 4 and supported by a plurality of brackets 21 adjacent the under side of housing 3 and is provided with a pin 22, the inner end of which terminates in a vertical groove 23 in spindle 4 by which construction collar 20 turns with spindle 4 but is held adjacent housing 3 and is provided with an angular scale which may be read in cooperation with a suitably positioned indicating pointer.

Casing 5 is provided with a set of roller bearings 24 at each end thereof, which bearings are adapted to support and guide a support bar 25 of substantially square section with diametrical axis ranged vertically and horizontally. Bar 25 has a limiting flange 26 at each end thereof such that the bar may be reciprocated in casing 5 on the bearing rollers 24.

Turret block 27 is secured to a lower portion of bar 25 and has a bearing plate portion 28 secured to it as by screws 29 which seat in bar 25. See Fig. 13. Plate 28 has a threaded bore 30 to receive the end of a bearing bolt 31 which pivotally supports the horizontal portion 32 of the bearing member having a vertical portion 33. Bearing member portion 32 has a pair of flange extensions 34 and 35 (Fig. 4) at substantially right angles to each other and each extension is provided with an adjustable stop screw 36 adapted to engage a retractable stop pin 37 mounted in an extension 38 of plate portion 28 and provided with a suitable lifting knob 39. Pin 37 may, as desired, be biased or provided with a pin by which it may be held out of range of stop screws 36, as is well understood.

Figure 14:
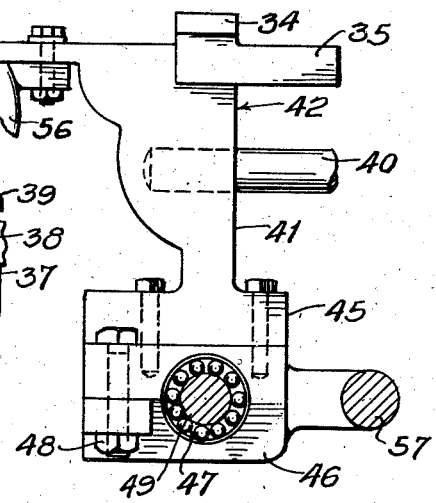
Fig. 14 is an elevation view of a part of a motor mounting frame including the saw spindle.

Bearing portion 33 is provided with a bearing pin 40 which is threaded into a flanged portion 41 of a motor supporting frame 42, a suitable thrust washer 43 and a nut 44 being provided for bearing pin 40. Flange portion 41 has a flange 45 to which is suitably secured a bearing block 46 in which are mounted a pair of roller bearings 47, block 46 being suitably split so as to be tightened by adjusting bolts 48. See Fig. 14. Bearings 47 carry a rotatable shaft 49 on one end of which is mounted a circular saw 50 which is secured on the shaft by suitable collars and a lock nut 51. See Fig. 6. The other end of shaft 49 carries one or more pulleys 52 which are driven by belt 53 from the corresponding number of pulleys 54 on a shaft 55 on a motor 56 suitably secured to the under side of supporting frame 42. See Fig. 4.

Bearing block 46 is provided with a suitable handle 57, and a saw guard 58 may be secured to frame 42, as shown. Casing 5 is provided with a lock screw 59 having an operating knob 60 and a shoe 61 which bears against one side of bar 25 so as to lock the same when desired. See Figs. 4 and 5.

A dial 62 reading in degrees is suitably secured to bearing pin 40 so as to turn therewith as frame 41 is tilted, and a pointer 63 is suitably secured to flange extension 34 so as to indicate the angular position of the frame by the corresponding inclination of dial 62. See Fig. 8.

Figure 11:
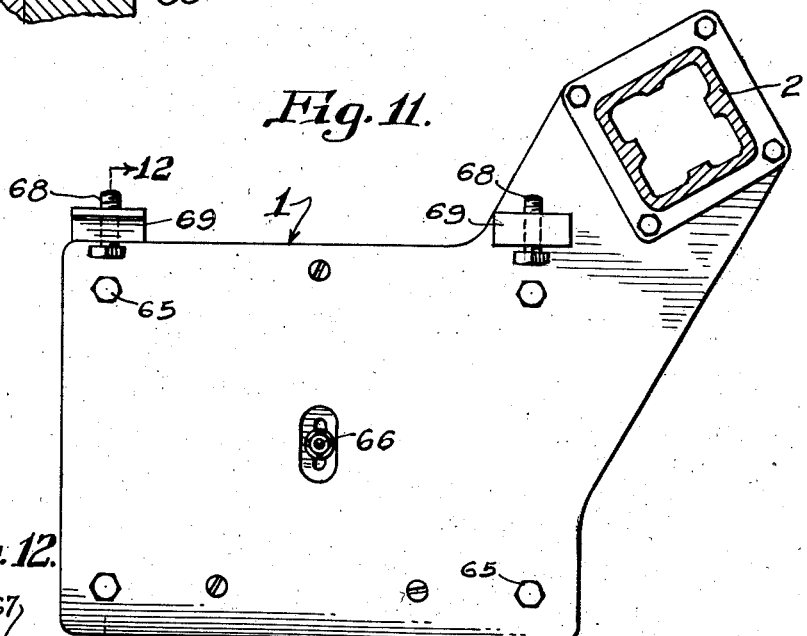
Fig. 11 is a plan view of a base member of the machine.
Figure 12:
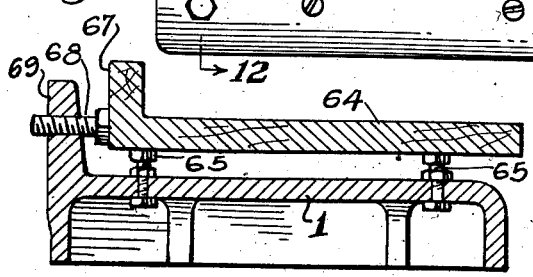
Fig. 12 is a sectional view taken along the line 12—12 of Fig. 11.

A work table 64 is adjustably supported by cap bolts 65 on base 1 and may be secured thereto by a suitable clamp screw 66 counter sunk in table 64. Table 64 has a guide rail 67 which bears against a pair of adjustable cap screws 68 in flanges 69 upstanding from base 1. See Figs. 3, 11 and 12.

The operation of the invention should be apparent from the foregoing description. The saw spindle and motor support frame 42 being pivotally mounted on flange 41, permits the saw 50 to cut work on table 64 at an angle from the vertical as may be clearly understood from Fig. 2. The bearing member portion 32 of the bearing member being pivotally mounted about the vertical axis of bolt 31, permits the saw frame to be adjustably positioned with respect thereto. The saw may be operated as an ordinary cross-cut saw by reciprocation of bar 25 in bearing casing 5, and the angle of this cut may be changed by rotation of spindle 4 in housing 3. This angle may be approximately 135 degrees because of the offset positioning of pedestal 2 with respect to base 1, and the saw may be swung from a position such as shown in Fig. 1 for making a 45 degree cut to a position where the saw may be used for ripping, and be parallel to guide rail 67. The depth of the saw cut may be varied by elevating screw 8, which adjustment may be made very readily. Thus it is clear that the saw is universally adjustable and can be used for cutting practically any vertical or horizontal angle.

Having described my invention what I claim is:

A rotary cut-off saw as described comprising a base having a pedestal and a work table thereon, a spindle housing on said pedestal, a bearing casing having a plurality of horizontally spaced bearings therein, and a spindle extending upwardly from the casing, a supporting and elevating screw for said spindle mounted on and extending into said housing and having a crank handle, said spindle having a plurality of longitudinal grooves, a collar on said spindle supported by said housing, a pin extending from said collar into one of said grooves, angle indicating means on said collar and housing, said collar being adapted to pivot with said spindle, said spindle adapted to reciprocate with respect to said collar and housing, a saw support bar having a substantially rectangular section longitudinally reciprocable in the bearings of said bearing casing, the diagonal axes of said section being horizontal and vertical respectively, a bearing member secured to said support bar and adapted for rotation about a vertical axis with respect thereto, a plurality of stops secured to said bearing member, and a retractable stop element on said support bar adapted to limit the rotation of said bearing member, a frame secured to said bearing member adapted for pivotal movement about a horizontal axis, angle indicating indicia on said frame and bearing member, and a rotary saw shaft and a motor drive therefor on said frame.

GEORGE MOORADIAN.

REFERENCES CITED

The following references are of record in the file of this patent:

UNITED STATES PATENTS

| Number | Name | Date |
| --- | --- | --- |
| 1,846,641 | Hedgpeth | Feb. 23, 1932 |
| 2,312,356 | Ocenasek | Mar. 2, 1943 |
| 2,343,243 | Roemer | Mar. 7, 1944 |
| 2,353,088 | Schutz | July 4, 1944 |
| 2,356,610 | Penney | Aug. 22, 1944 |